April 13, 1971 E. A. HEAVENER 3,574,807

METHOD OF MOLDING WITH AN ANGULATED CAVITY FORM

Filed Dec. 20, 1967 6 Sheets-Sheet 1

INVENTOR.
EDWARD A. HEAVENER
BY Flam and Flam
ATTORNEYS.

METHOD OF MOLDING WITH AN ANGULATED CAVITY FORM

Filed Dec. 20, 1967 6 Sheets-Sheet 2

INVENTOR
EDWARD A. HEAVENER
BY Flam and Flam
ATTORNEYS.

April 13, 1971 E. A. HEAVENER 3,574,807

METHOD OF MOLDING WITH AN ANGULATED CAVITY FORM

Filed Dec. 20, 1967 6 Sheets-Sheet 3

INVENTOR.
EDWARD A. HEAVENER
BY Flam and Flam
ATTORNEYS.

METHOD OF MOLDING WITH AN ANGULATED CAVITY FORM
Filed Dec. 20, 1967 6 Sheets-Sheet 4
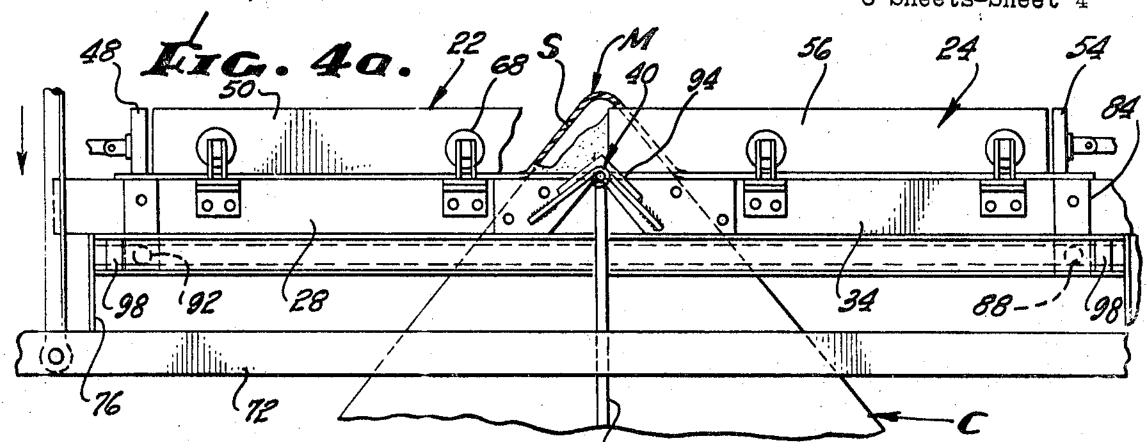
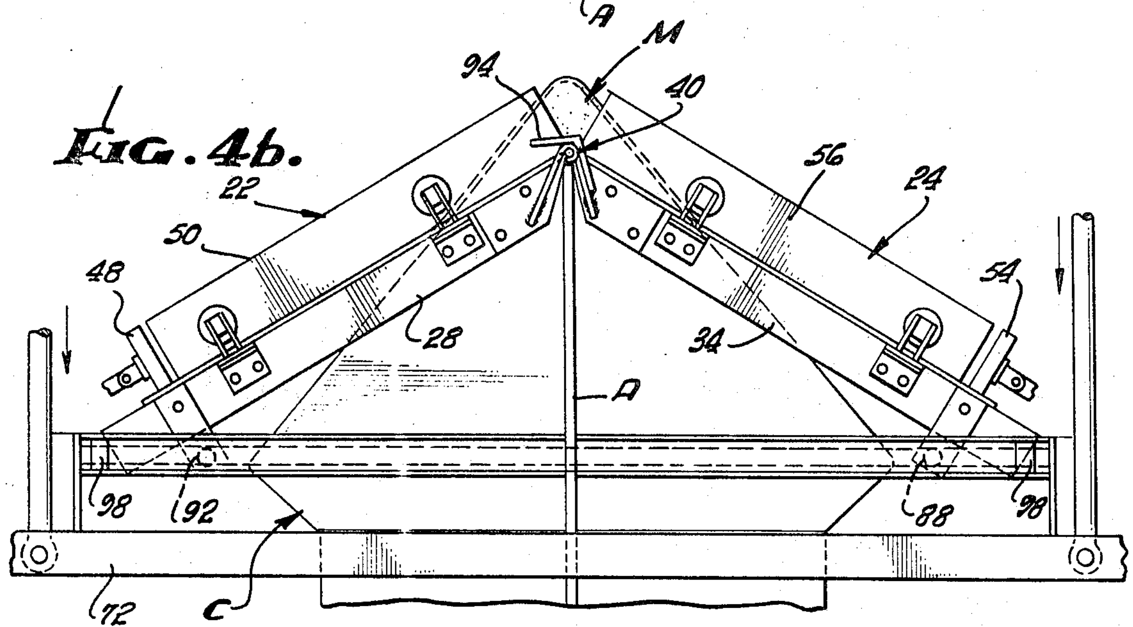
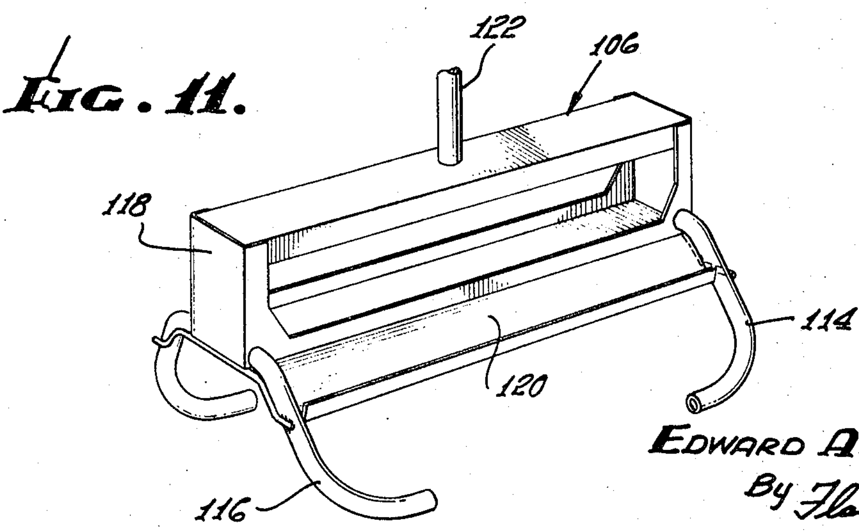
INVENTOR.
EDWARD A. HEAVENER
BY Flam and Flam
ATTORNEYS.

METHOD OF MOLDING WITH AN ANGULATED CAVITY FORM
Filed Dec. 20, 1967 6 Sheets-Sheet 5
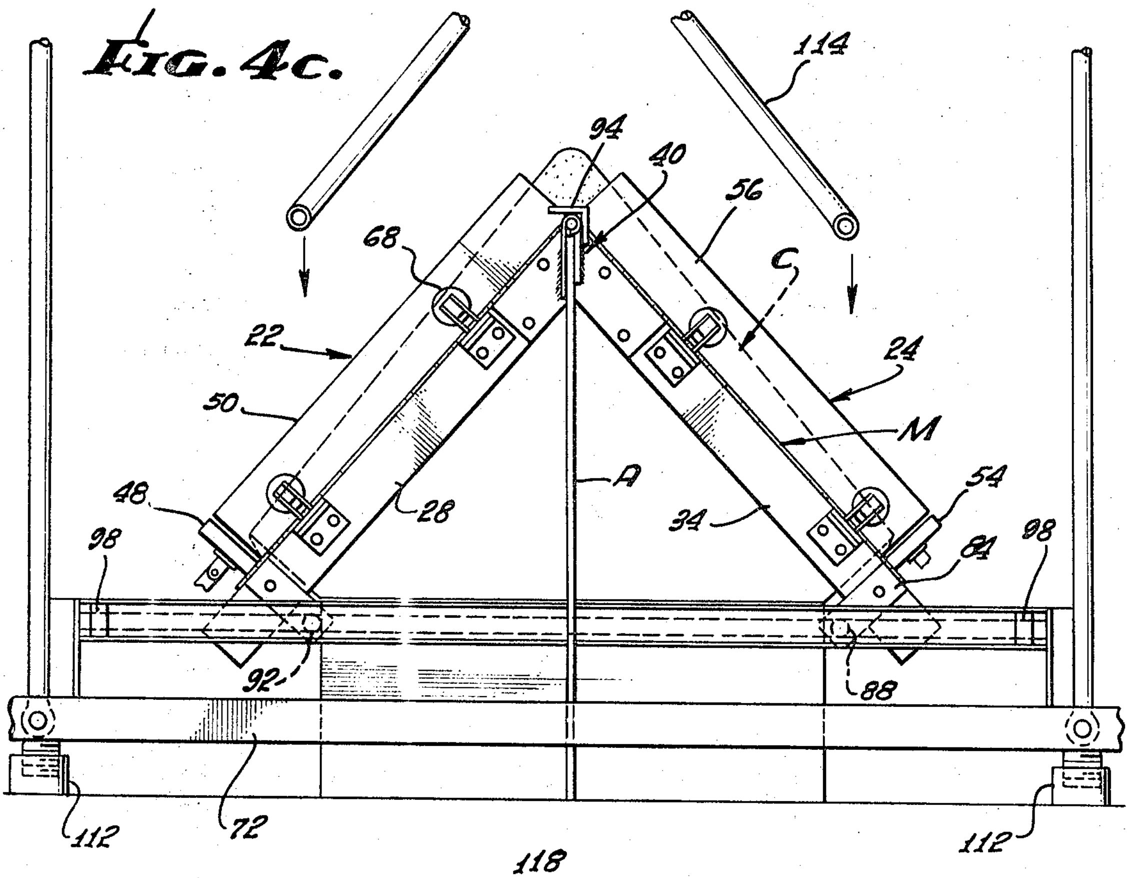
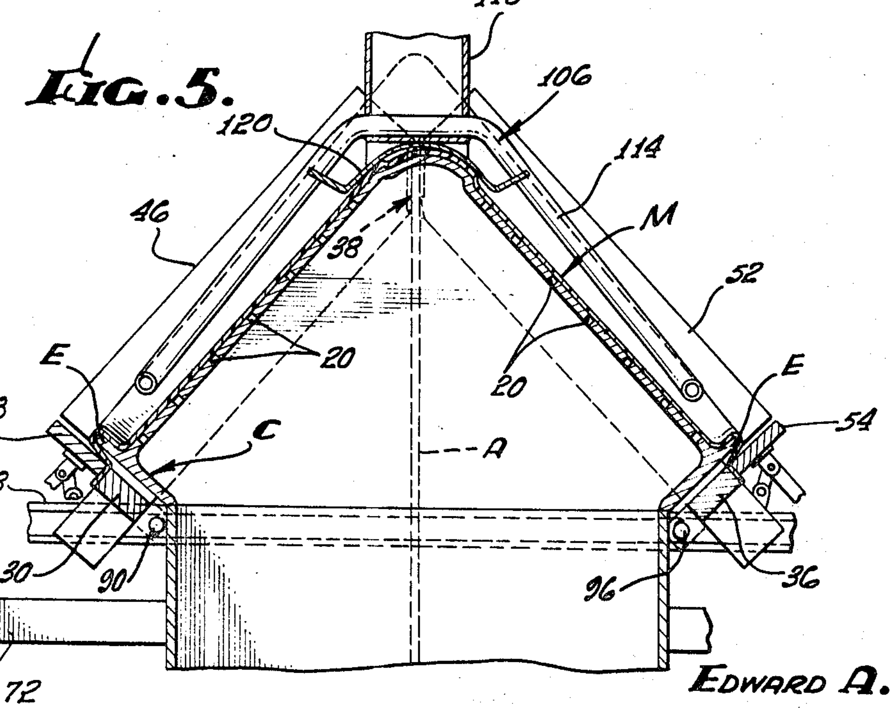
INVENTOR.
EDWARD A. HEAVENER
BY Flam and Flam
ATTORNEYS.

METHOD OF MOLDING WITH AN ANGULATED CAVITY FORM
Filed Dec. 20, 1967
6 Sheets-Sheet 6
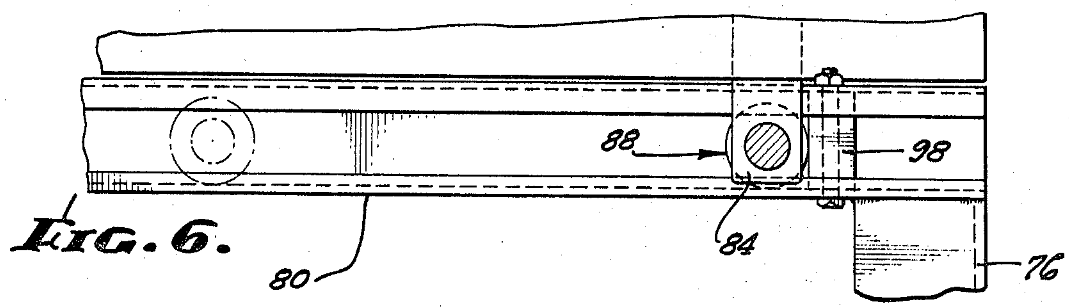
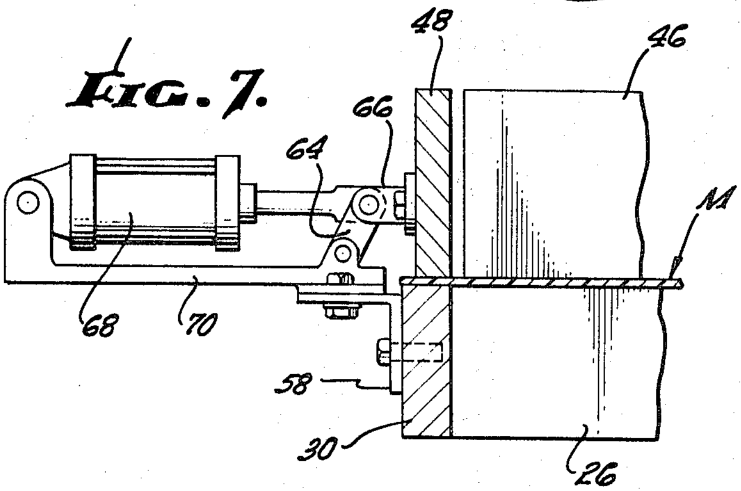
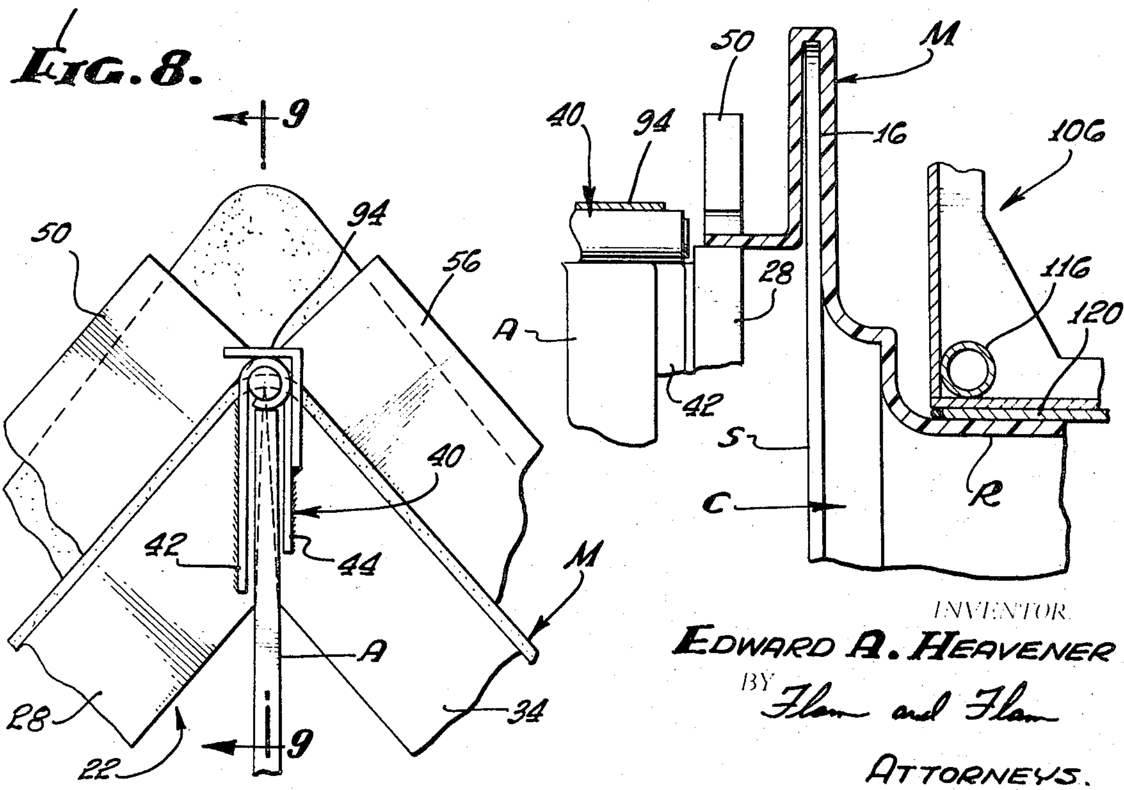
INVENTOR.
EDWARD A. HEAVENER
BY Flam and Flam
ATTORNEYS.

United States Patent Office 3,574,807 Patented Apr. 13, 1971

3,574,807
METHOD OF MOLDING WITH AN ANGULATED CAVITY FORM

Edward A. Heavener, Long Beach, Calif., assignor to Gulf Development, Inc., Los Angeles, Calif.

Filed Dec. 20, 1967, Ser. No. 692,193
Int. Cl. B29c *17/02, 17/04*
U.S. Cl. 264—92 6 Claims

ABSTRACT OF THE DISCLOSURE

Sheet material to be formed over the angulated cavity form C (FIGS. 1 and 2) is clamped on a frame F. The frame F and preheated sheet M are lowered by hydraulic motors H. Abutments A engage the lowering frame F and cause it to fold about the angulated form (FIGS. 4*a* and 4*b*) progressively to effect seals along side flanges S of the form (FIG. 2) and ultimately to form seals along the end flanges E by an overdraw. Vacuum is then applied. The depth of draw is minimized; the wall thickness is substantially maintained to achieve substantial strength in the finished part; very little plastic material is wasted as the molded part is trimmed.

BRIEF SUMMARY OF THE INVENTION

This invention relates generally to the art of vacuum molding. Certain structures extend essentially in two dihedral planes, usually at right angles to each other. One example of such structure is a restaurant booth having a back portion and a seat portion. Even an arcuate restaurant booth can be characterized as extending in two or more dihedral planes. Many other structures fall in this general category. In the past it has been common to mold such articles by spraying or coating liquid plastic on a form or mold and interposing glass fibers or fabrics between the plastic layers for structural reinforcement. No worker of ordinary skill in the plastic molding arts seriously considered vacuum molding such articles because extremely deep draws were required to achieve such configurations. Such deep draws involved a substantial reduction in the thickness of the material and hence either structural deficiencies or sheet material of excessive thickness. Furthermore, such deep draws further necessarily resulted in excessive waste material as the molded article was trimmed.

The primary object of this invention is to provide a method for vacuum forming structures of this character free of the foregoing disadvantages whereby the vacuum forming technique can be economically applied to a vast new field of use.

In order to accomplish this object, I provide means for draping the preheated sheet plastic material about an angulated cavity form having convex sealing flanges.

A companion object of this invention is to provide a method in which buckling or laminating of the sheet material is avoided without imposing undue draws on the sheet material.

Another companion object of this invention is to provide a method whereby the sheet material is not tensioned or weakened as it is draped about the form. For this purpose, a certain concentric or aligned arrangement of bending axes to the sheet material is maintained, and initiation of the bending or draping function is controlled so as to take place at a predetermined position relative to the angulated mold or form.

Another object of this invention is to provide a method for accomplishing the foregoing functions that is capable of programmed or automatic operation.

This invention possesses many other advantages and has other objects which may be made more clearly apparent from a consideration of one embodiment of the invention. For this purpose, there is shown a form in the drawings accompanying and forming a part of the present specification, and which drawings are true scale. This form will now be described in detail, illustrating the general principles of the invention; but is is to be understood that this detailed description is not to be taken in a limiting sense, since the scope of this invention is best defined by the appended claims.

BRIEF DESCRIPTION OF THE DRAWINGS

FIGS. 4*a*, 4*b* and 4*c* are enlarged side elevational views of the molding machine taken in the direction of the arrow 4 of FIG. 3 and showing successive positions of the apparatus.

FIG. 5 is a view similar to FIG. 4*c*, but taken in section along a transverse vertical plane as indicated by the line 5—5 of FIG. 3.

FIG. 6 is an enlarged fragmentary sectional view taken along a plane corresponding to line 6—6 of FIG. 2.

FIG. 7 is an enlarged fragmentary sectional view taken along a plane corresponding to line 7—7 of FIG. 3.

FIG. 8 is an enlarged fragmentary elevational view showing the corner area of the mold as shown in FIG. 4*c*.

FIG. 9 is a fragmentary sectional view taken along a plane corresponding to line 9—9 of FIG. 8.

FIG. 10 is a pictorial view of the molded part.

FIG. 11 is a pictorial view of part of the mold mechanism.

DETAILED DESCRIPTION

The molded part shown in FIG. 10 in this instance is a restaurant booth having a back portion 10 and a seat 12. This restaurant booth is characteristic of various structures that have parts extending generally in two dihedral planes. The part is trimmed along the dotted lines 14 and thereafter attached to a suitable base. Cushions may be secured to the seat and back portions as appropriate.

Figure 1:
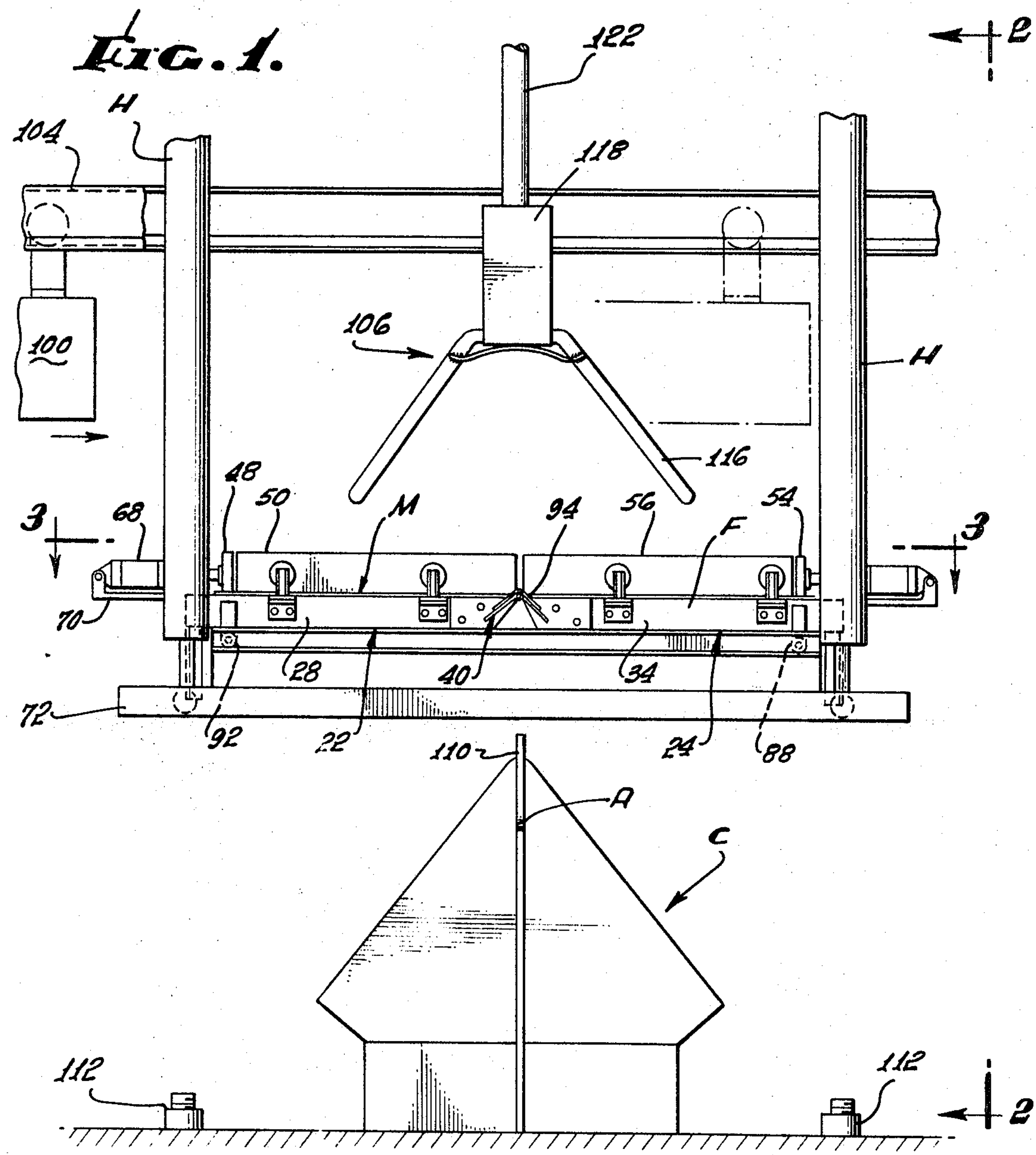
FIG. 1 is a side elevational view of the vacuum molding machine incorporating my invention.
Figure 2:
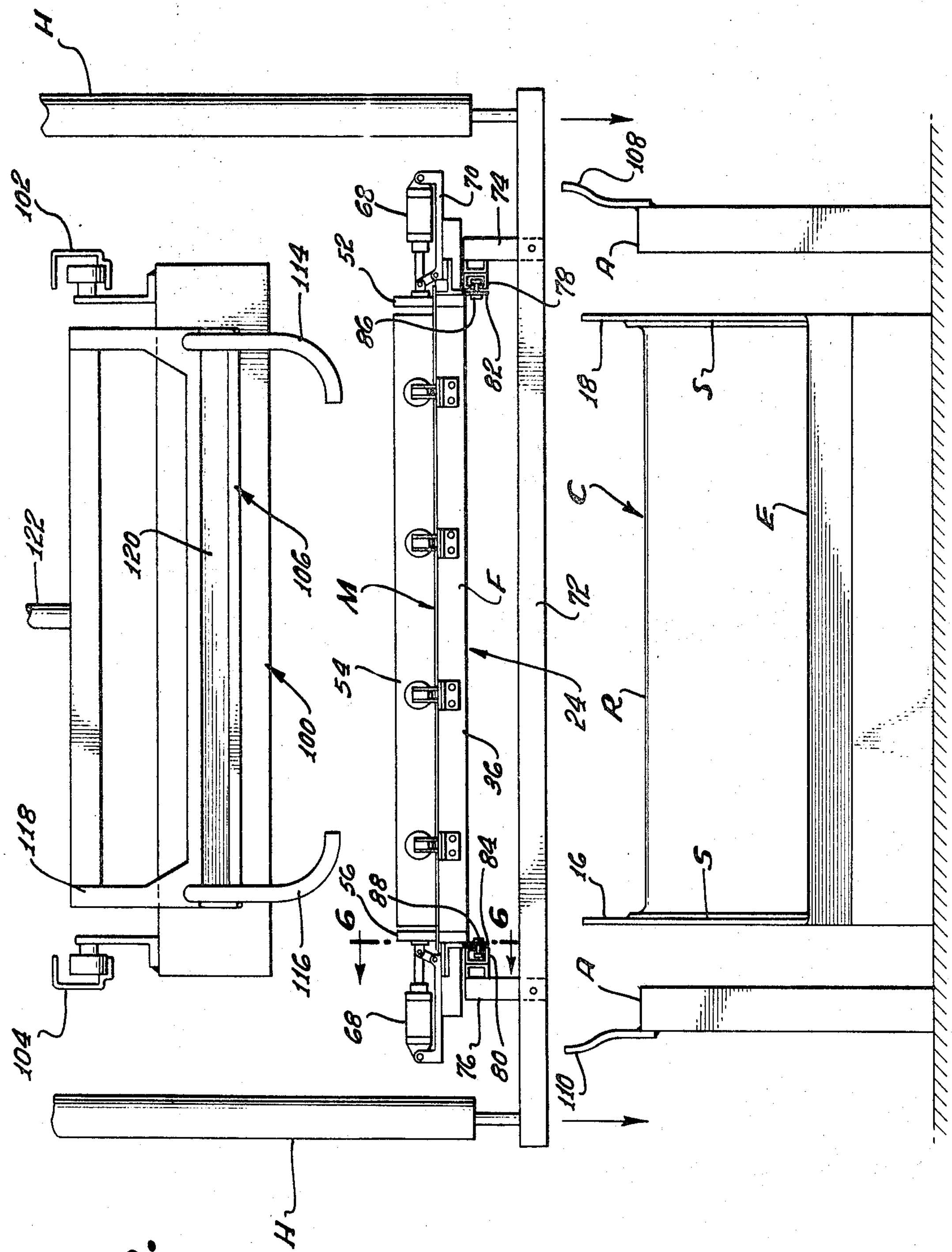
FIG. 2 is another side elevational view taken in a direction corresponding to line 2—2 of FIG. 1.

The molded part is made from a cavity form or mold C shown in FIGS. 1, 2 and 5. The mold C has side flanges S (FIG. 2) conforming to the side flanges of the molded part of FIG. 10. The side flanges meet at rounded apices 16 and 18 that are positioned at the top of the mold, the back and seat portions extending angularly downwardly. The mold C furthermore has end flanges E joining the side flanges S at areas corresponding first to the top of the restaurant booth back and second, to the front edge of the restaurant booth seat (see also FIG. 5). The mold C has contoured surfaces located within the boundaries of the side and end flanges as shown in FIGS. 2 and 5. The mold essentially provides a cavity, but sections of the cavity extend in angular relationship with respect to each other in contrast to the usual arrangement in which a cavity extends inwardly from a single plane. The cavity sections are angled with respect to each other about an axis passing substantially through the apices 16.

Moldable plastic sheet material M (FIG. 4*a*) is draped about the mold C so as to provide a seal along the side and end flanges S and E, whereupon a vacuum may draw the sheet material into conformance with the mold surface. By virtue of this arrangement the depth of draw is minimized.

As shown in FIG. 5, the mold C is provided with a plurality of apertures 20 for exhausting air from the space between the mold surface and the sheet material draped about the side and end flanges. A suitably controlled vacuum source may selectively be placed in communication with the interior of the mold C.

Before the sheet material can be wrapped about the mold C, it must first be heated to a fairly plastic state. To hold the material M, a frame F is provided to which the flat sheet material M is clamped. The frame F is generally rectangular and, for purposes presently to appear, is made in two hingedly connected sections 22 and 24 (see also FIG. 3). The frame sections 22 and 24 may be made, for example, of rectangular bar stock material. The frame section 22 consists of spaced parallel frame members 26 and 28 (FIG. 3) and a third frame member 30 interconnecting corresponding ends of the frame members 26 and 28 to form a three-sided structure. The frame section 24 similarly comprises frame members 32 and 34 connected by a frame member 36. The free ends of the frame members 26 and 32 are pivotally connected by a hinge 38; ends of the frame members 28 and 34 are similarly connected together by a similar hinge 40. These hinges are located outside the frame sections. Leaves 42 and 44 of the hinge 40 (FIG. 8) are respectively welded or otherwise secured along miter-cut ends of the frame members 28 and 34. The hinge 38 is similarly attached.

The frame sections together provide a generally quadrilateral structure in which the sections 22 and 24 can be moved from a substantially coplanar or flat relationship to an angular relationship with respect to each other.

Figure 3:
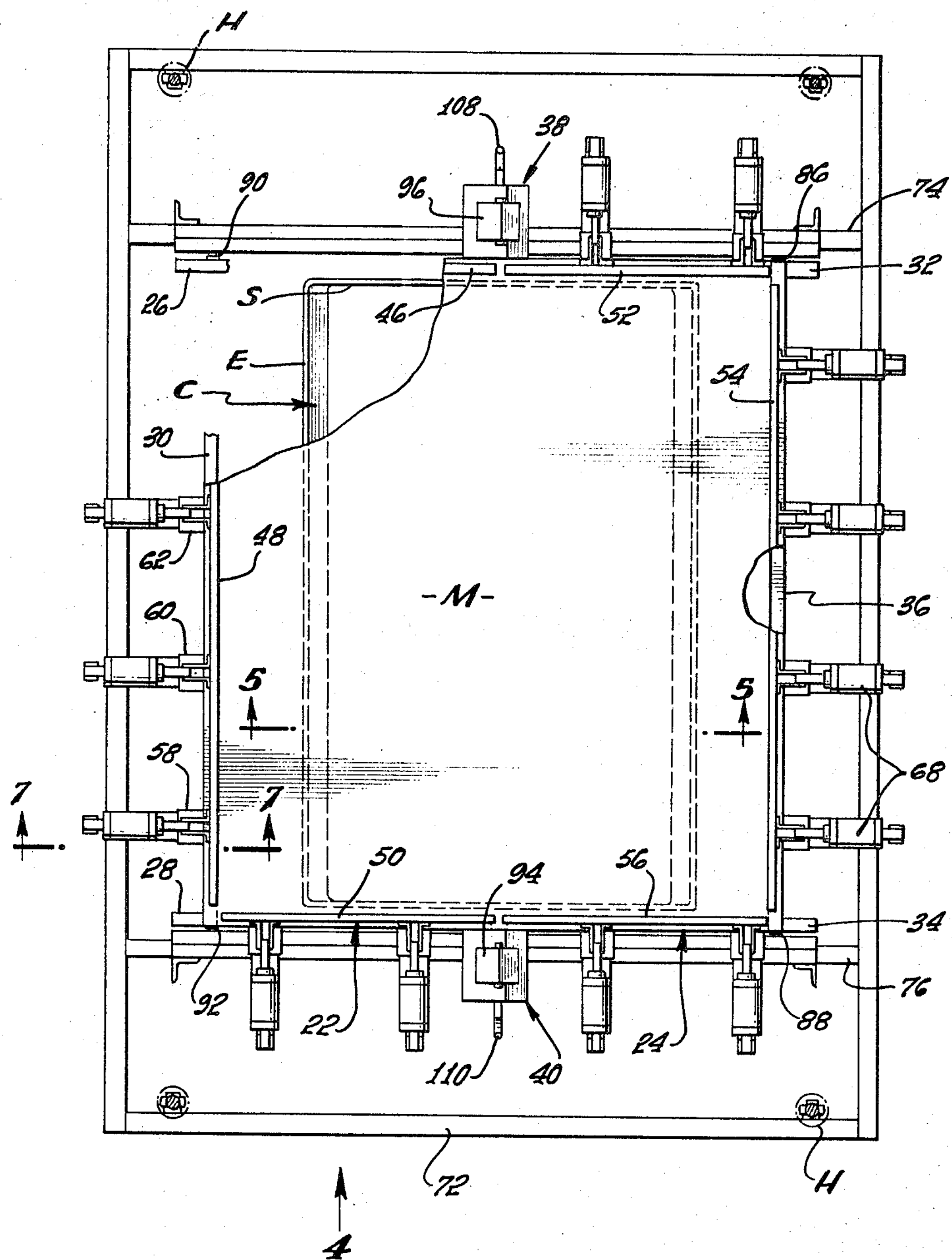
FIG. 3 is a horizontal sectional view taken along a plane corresponding to line 3—3 of FIG. 1.

The frame sections together provide flat upper surfaces upon which the marginal portions of the material M may rest as shown in FIG. 3. The sheet material M is clamped to the frame members by the aid of a plurality of clamp bars. Three clamp bars are provided for each frame section corresponding to the three frame members thereof.

Clamp bars 46, 48 and 50 are provided for the frame section 22, and clamp bars 52, 54 and 56 are provided for the frame section 24. The clamp bars, like the frame members, are made of rectangular bar stock. The bars are all similarly mounted so as to move from a retracted position beyond the periphery of the frame to a clamping position at the upper surfaces of the frame members. The clamp bar 48 for the frame member 30, as shown in FIG. 7, typifies the arrangement.

Mounted on the outside of the frame member 30 are a plurality of angle brackets 58, 60, 62, etc. (FIG. 3). Each angle bracket, as for example the angle bracket 68 (FIG. 7), carries a link 64. The link connects to a corresponding clevis 66 secured to the outer surface of the clamp bar 48. A hydraulic motor 68 operates the link 64 and accordingly moves the clamp 48 from its retracted position to its clamped position. The hydraulic motor 68 is pivotally mounted on a bracket 70 attached to the angle bracket 58 to allow for the angular movement at the link 64.

The frame sections 22 and 24 are first suspended above the mold form C (FIG. 1), with the sections in flat relationship with respect to each other, with the clamp bars retracted. The flat sheet material is then positioned and clamped in place.

In order to suspend the frame F, an open rectangular support 72 as shown in FIG. 3 is provided. Hydraulic lifts H are connected at the corners of the support for moving it up and down. The support 72 carries two parallel cross members 74 and 76 that respectively mount channel tracks or rails 78 and 80. Depending from the members 32 and 34 of the frame section 24 are brackets 82 and 84 (see also FIG. 6) mounting roller assemblies 86 and 88 that ride along the tracks 78 and 80, respectively. The frame members 26 and 28 similarly carry roller assemblies 90 and 92 (FIG. 3) that ride along the tracks 82 and 84.

The roller assemblies are located substantially at the corners of the rectangular frame. As the roller assemblies 88 and 92 (FIG. 1) and 86 and 90 are caused to move toward each other from the position shown in FIG. 2, the frame sections 22 and 24 move angularly about the common axes of the hinges 38 and 40. When the rollers 88–92 and 86–90 are allowed to move apart, the frame sections 22 and 24 move toward a flat relationship with each other.

Straps 94 (FIGS. 1, 3 and 8) and 96 (FIG. 3) form stops or abutments, preventing the frame sections 22 and 24 from moving angularly beyond the flat position illustrated in FIG. 1. The strap 94 as shown in FIG. 8, is conveniently formed as a piece of metal angle, with one side secured to the hinged leaf 44 and the other side positioned to engage the hinged leaf 42 upon angular movement of the frame sections 22 and 24 in one direction (FIG. 1).

Spaced abutments for each rail 78 and 80 are located so as to hold the frame against lateral movement when frame sections are flat. In the present instance, the abutments are formed by blocks 98 (FIG. 6) secured in appropriate adjusted positions. The abutments also center the frame sections 22 and 24 relative to the cavity form C below for purposes hereinafter to appear.

In order to preheat the sheet material M, a heater 100 (FIG. 1) is provided. The heater is suspended on overhead rails 102 and 104 (FIG. 2). As shown in FIG. 1, the heater 100 may be moved from the juxtaposed phantom-line position shown in FIG. 1 to the retracted full-line position shown therein. When the heater is in operative juxtaposed position, a spreader or helper mechanism 106, to be hereinafter described, is upwardly retracted.

After the material is heated to a suitable plastic state, the hydraulic lifts H are simultaneously lowered so that the supporting rails 78 and 80 remain parallel, horizontal and at the same level.

As indicated by the plan view in FIG. 3, the frame sections 22 and 24 are positioned to pass just beyond the side flanges S of the mold. When the sheet material is lowered to the position of FIG. 4*a*, it has been drawn about the apex areas of the side flanges, the frame sections 22 and 24 remaining flat. The material is thus drawn only at two areas. The knuckles of the hinges 38 and 40 at this position engage abutments A (FIG. 2). Downward movement of the frame sections 22 and 24 is stopped at the hinge areas only.

Guides 108 and 110 (see also FIG. 3) engage the edges of the hinges and ensure that the frame assembly is centered as it descends over the cavity form C. The abutments A may be attached to the sides of the form C if desired.

As the lifts H continue to move downwardly (FIG. 4*b*), the frame sections are forced to fold towards each other by virtue of the tracks 78 and 80 and the rollers 86, 88, 90, 92. Seals are progressively formed along the side flanges S. Ultimately, seals are effected at the end flanges E of the cavity form. The hydraulic lifts H continue to move downwardly by a small increment determined by stops 112 to draw the material about the outer surface of the end flanges E. The plastic material is now more or less drum tight between the peripheral flanges of the mold.

When the hinges 40 and 42 are stopped, their common axis $x$ falls between the ridge R of the cavity mold and the then level of the plastic material M. As the frame sections 22 and 24 fold, the sheet material above the ridge R and between the side flanges is slightly stretched since the bending axis is beneath the material. However, the material resists such stretching and dips slightly toward the ridge.

As shown in FIGS. 8 and 9, the hinge axis is at precisely the same level as the clamped material. Thus as the sections fold, the material at the corner is neither stretched nor buckled. The frame members 28 and 34 are rounded to prevent corners from pushing through the material M as the sections fold, and to ensure perfect contact at the end of the fold. The rounded areas progressively engage along the marginal portion of the sheet material ensuring a uniform engagement.

The spreader or helper 106 assists the movement of the sheet material into conformance with the mold surface, especially at the corners. The spreader moves downwardly after movement of the frame is stopped. As shown in FIG. 11, the spreader 106 has two curved end sections 114 and 116, each formed of bent tubular bar stock. The sections have a configuration to extend along the inside surfaces of the side and end flanges to assist movement of material into the corners. The sections 114 and 116 are supported at ends of a box-like head 118.

The spreader or helper 106 also has a concave pan 120 (see also FIGS. 5 and 9) suspended from the head 118. The pan engages the material along the ridge R and prevents buckling or laminating by ensuring that the material firmly abuts the ridge R. The head 118, as shown in FIG. 1, is carried by a hydraulic motor device 122. As the spreader urges the material into position, vacuum is applied.

The distance along the surface of the mold from the top of one end flange E to the top of the other, is just slightly greater than the corresponding dimension of the sheet material when flat. This ensures a substantially uniform wall thickness of the molded part.

After the plastic material has been molded, the clamp bars are released, the spreader or helper 106 is elevated, and the part stripped from the mold. The operation of the clamping members, the hydraulic lifts, and the heater can be programmed so that the entire operation if desired can be automated.

I claim:

1. A method of molding an article by the aid of a trough-like cavity form having angulated peripheral seal flanges located in dihedral planes so that apex areas of said seal flanges are convex, said method comprising positioning preheated sheet thermoplastic material in a frame opposite the cavity form; moving the frame relative to the form to engage the sheet plastic with the apex areas of said flanges; thereafter folding the frame to bend the sheet plastic material about an axis substantially fixed with respect to the form and passing through the apex areas of said seal flanges progressively to engage adjoining portions of said seal flanges on opposite sides of said apex areas to define an inner moldable part of said sheet and an outer marginal part of said sheet; stretching the marginal part of said sheet by forcing it beyond said seal edges to form a sealed space bounded by said inner moldable part and said cavity form; and thereafter applying a vacuum to the cavity form to draw the plastic material into engagement with the cavity form surfaces bounded by said peripheral flanges.

2. A method of molding an article from flat plastic material by the aid of an angulated trough-like cavity form having peripheral flanges the edges of which extend substantially in two dihedral planes with apex areas of said flanges extending convexly, which comprises: clamping the edges of the sheet material in a frame; positioning the frame opposite the cavity form; moving the frame and the form together to force the apex areas of the form to draw said sheet material; folding the frame about an axis substantially fixed with respect to the form and passing through the apex areas progressively to form seals along said flanges in opposite directions from said apex areas; continuing the folding of the frame until said flanges form a closed loop seal about one side of said sheet material and to define an inner moldable part and an outer marginal part of said sheet; and thereafter applying a vacuum to said cavity form.

3. The method as set forth in claim 2 in which the clamped material is folded about an axis passing through said sheet material.

4. The method as set forth in claim 2 in which said cavity form has a ridge extending between said apex areas of said flanges wherein said clamped material is folded about an axis passing through the clamped sheet material and extending substantially along said ridge.

5. The method as set forth in claim 2 in which said cavity form has a ridge extending between said apex areas of said flanges wherein said clamped material is folded about an axis extending in spaced relationship to said ridge.

6. The method as set forth in claim 5 including the step of pressing the material along the ridge to conform to the configuration thereof.

References Cited

UNITED STATES PATENTS

| | | | |
|---|---|---|---|
| 3,273,203 | 9/1966 | Ross | 264—92X |
| 3,342,915 | 9/1967 | Wanderer | 264—92 |

FOREIGN PATENTS

| | | | |
|---|---|---|---|
| 862,533 | 3/1961 | Great Britain | 264—92 |
| 988,975 | 4/1965 | Great Britain | 264—92UX |

ROBERT F. WHITE, Primary Examiner

J. H. SILBAUGH, Assistant Examiner

U.S. Cl. X.R.

18—19; 264—296, 339